Patented Aug. 4, 1942

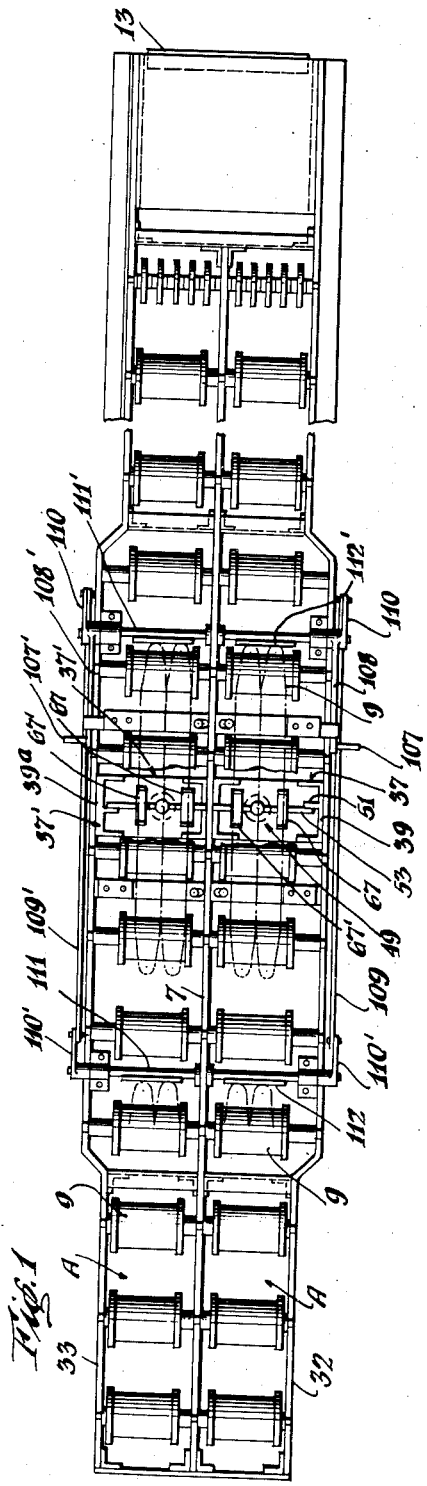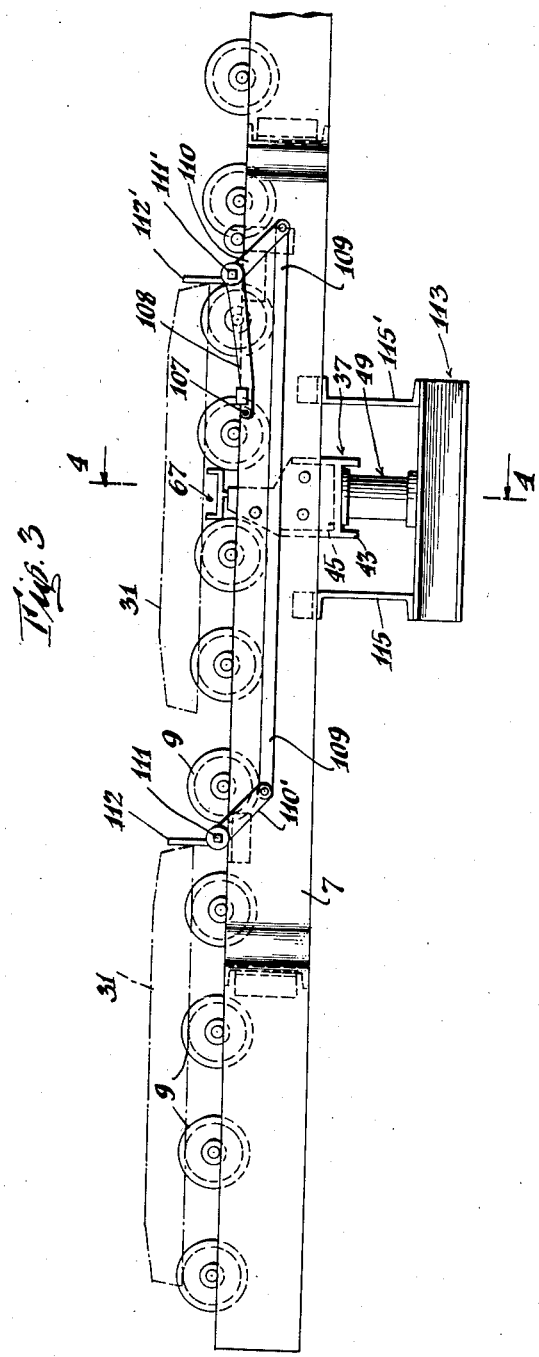

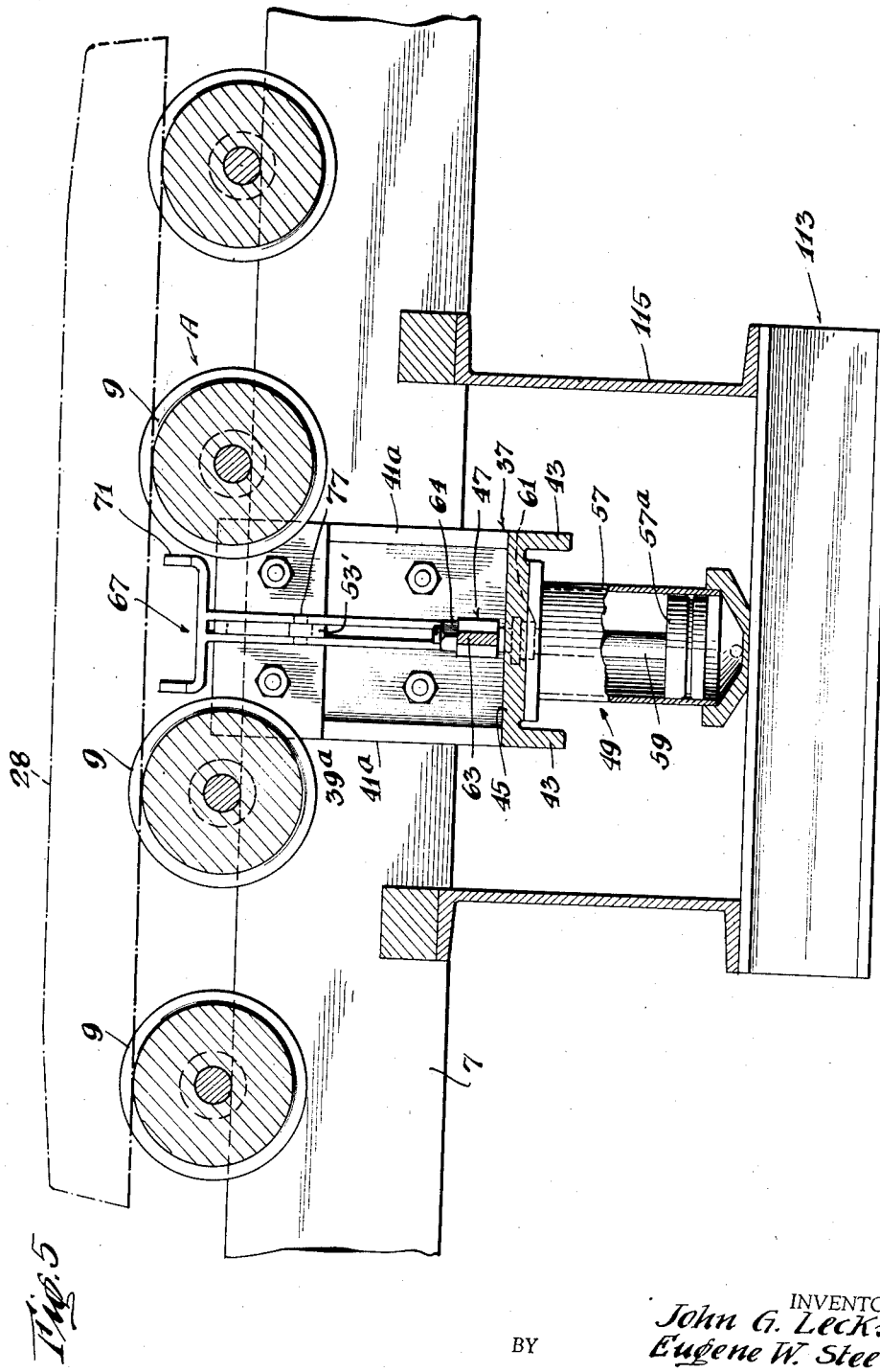

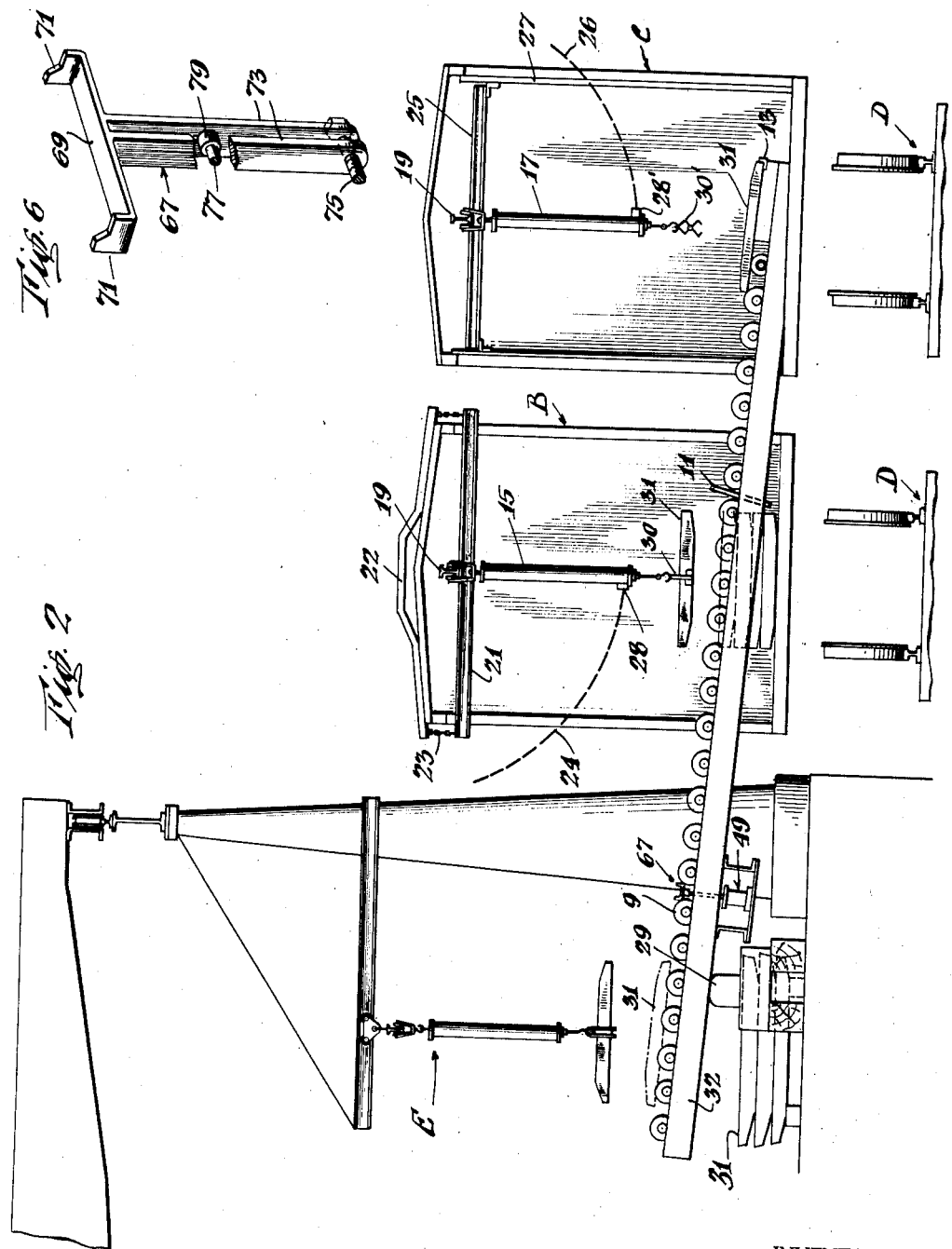

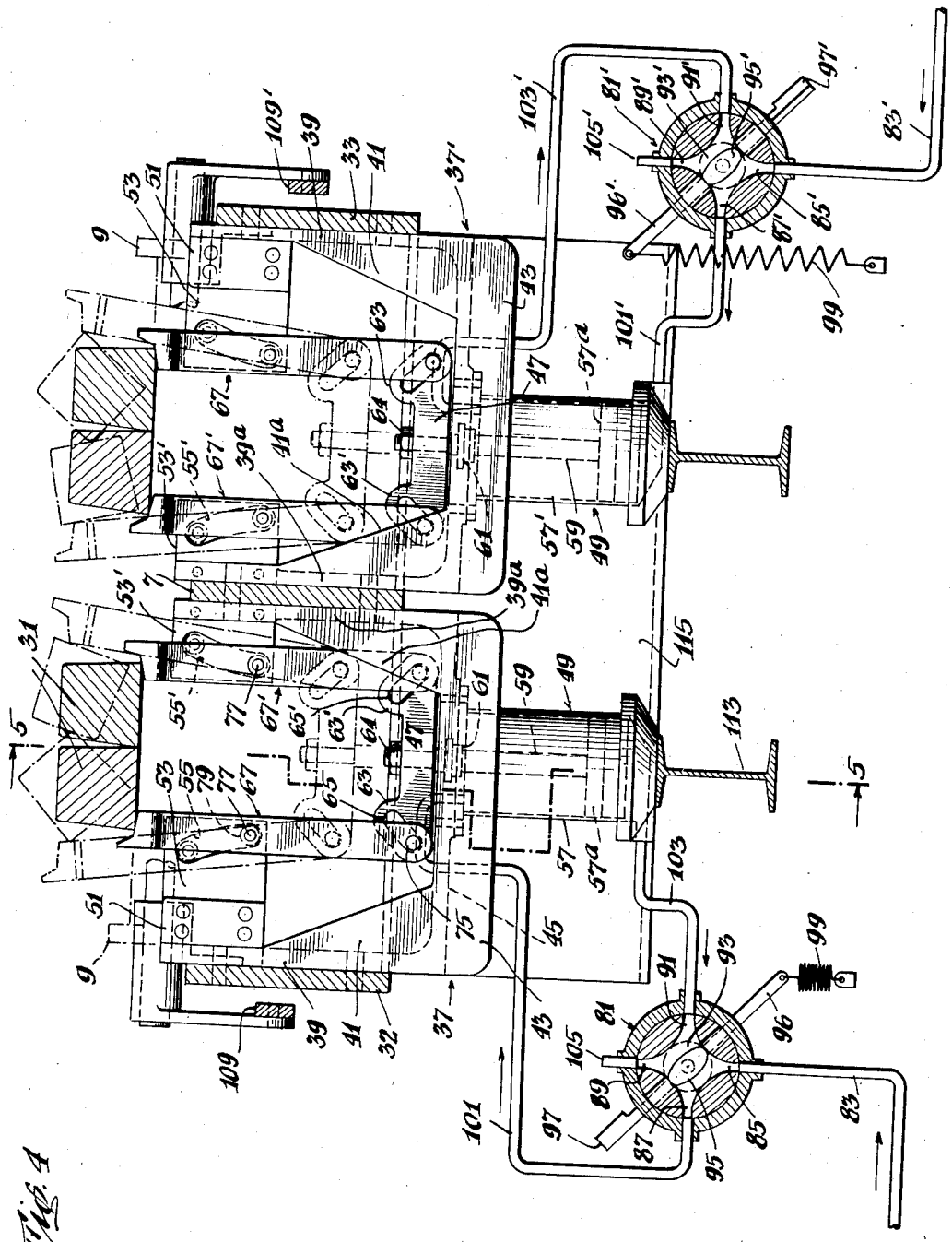

2,291,969

UNITED STATES PATENT OFFICE

2,291,969

MATERIAL HANDLING MECHANISM

John G. Leckie and Eugene W. Steele, Baltimore, Md., assignors to American Smelting and Refining Company, New York, N. Y., a corporation of New Jersey Application November 14, 1940, Serial No. 365,588

10 Claims. (Cl. 193—43)

This invention relates broadly to improvements in mechanism for handling and conveying articles. More specifically, the invention pertains to an improved conveyor for cast or molded metal bars or shapes which includes mechanism for turning the shapes as they are moved along so that they can be inspected.

The principal object of the invention is to provide an improved conveyor for handling heavy articles, such as cast metal shapes, which comprises an inspection section having mechanism for flipping the articles over for examination while they are supported on the conveyor. In this way all sides and surfaces of the metal shapes can be inspected and any imperfections corrected before the articles are loaded for shipment or stored.

The novel features of the invention will be described in connection with the handling and inspection of copper wire bars, but it will be appreciated that this is merely illustrative and not limitative of our invention.

One object of the invention is to provide an improved inspection conveyor for facilitating inspection of multiple-sided shapes which are too heavy to be handled manually, the conveyor including mechanism for turning the shapes as they pass along the conveyor, so that all sides of the shapes will be made available for inspection; and, in case of wire bars, for chipping off surface imperfections before the shapes are loaded into cars or other equivalent transporting vehicle.

Further objects and advantages of the present invention will become apparent as the description proceeds and the features of novelty will be pointed out in particularity in the appended claims.

The invention will be understood more readily by reference to the accompanying drawings, in which Fig. 1 is a plan view, partly broken away, of a conveyor embodying the features of the present invention.

Fig. 2 is a longitudinal sectional elevation showing the conveyor in use, the view showing a double line of box cars being loaded from the conveyor and the method of loading wire bars for shipment.

Fig. 3 is a fragmentary side elevation of the conveyor structure.

Fig. 4 is a transverse sectional elevation, taken on the line 4—4 of Fig. 3, showing operative details of the mechanism.

Fig. 5 is a longitudinal sectional elevation taken on the line 5—5 of Fig. 4, showing additional structural details of the construction.

Fig. 6 is a perspective view, partly broken away, showing one of the lifting and turning devices employed in this invention.

Referring more particularly to the drawings, A represents a conveyor frame which is divided into two identical sections by a beam 7 extending longitudinally with respect to the conveyor frame. The frame A is made up of longitudinal and transverse channel members on which the rollers 9 are suitably mounted. The supporting conveyor frame is inclined so that the articles being conveyed will pass along from one end of the conveyor to the other by gravity. For handling copper wire bars, preferably the rollers are made wide enough to accommodate two wire bars arranged side by side, so that double rows of wire bars may be conveyed simultaneously along each half of the conveyor.

The conveyor slopes downwardly from the loading end to the discharge end, which may be positioned in a box car or other shipping vehicle. In Fig. 2, it is shown that the same conveyor A may be employed to load either one of two box cars B and C parked side by side on tracks D, releasable stop 11 being provided to hold up the travel of selected wire bars to permit removal thereof by the provided mechanism, the stop mechanism being maintained retracted when it is desired that the wire bars travel the full length of the conveyor into the farther car. This construction will be described in detail hereinafter.

The stop 11 is inserted between adjacent rolls of the conveyor, so as to stop in car B, the wire bars to be loaded therein from the conveyor. An end stop or abutment 13 is provided at the end of the conveyor in car C, so that wire bars passed through car B will be stopped where they can be loaded into car C from the conveyor.

Similar hoists 15 and 17 in the respective cars may be employed for removing the bars from the conveyor and placing them properly in the cars, each of the hoists being mounted on an I-beam monorail track 19, along which the respective hoist may be moved to any desired position in the car.

Each monorail 19 is carried by cross-beam supports spaced at intervals along the car. Thus, at the doors of each car a cross-beam support 21 may be strung over the top of the car by a bar 22 carrying suspension chains 23, from which hangs the supporting beam 21. The hoists 15 and 17 may be conveniently air hoists, air being supplied thereto through hose lines 24, 26, connected at the connection 28, 28', tongs 30, 30' being employed to grasp and lift the bars.

End beams 25, which are at each end of the cars to carry the ends of the monorail track, are mounted on removable frames, such as illustrated at 27. The conveyor A is mounted so as to slope downwardly from the loading end to the discharge end, the illustration showing the conveyor to be resting upon blocks 29.

Wire bars 31 are shown as being piled beside the conveyor by a yard storage crane, individual bars being lifted from the pile by hoist mechanism E and laid side by side on the conveyor along which they pass by gravity until they are picked up by one of the hoists 15, 17, depending upon which car is being loaded.

While these wire bars have been inspected carefully at the casting house preparatory to getting them ready for shipment, it is desirable to give them a thorough and final inspection on all sides before they are actually loaded on the cars or other transporting conveyance. As the bars are far too heavy for manual handling, means must be provided for turning the bars mechanically so that all four sides of the bars will become accessible to an inspector for chipping or removal by any other means, of any surface imperfections that hitherto may have escaped notice.

Such mechanical means constitute an important part of the present invention, and now will be described in detail, it being understood that the mechanism is duplicated for each longitudinal section of the conveyor. In this connection, it will be seen from Fig. 1 that the bed of the conveyor is widened substantially at the part thereof which contains this mechanism.

It will be seen in the illustrated embodiment of the invention that similar castings 37, 37' are mounted on one of the side beams 32 and intermediate beam 7, and on the intermediate beam 7 and side beam 33, these beams 32 and 33 being the side beams of the conveyor frame. These castings therefore form yokes which connect the sides of the conveyor to the intermediate beam. As has been said above, the construction is duplicated on both sides of the conveyor so that a detailed description need be given for the construction of one side of the conveyor.

Referring then to the details of construction of the left-hand half of the conveyor as viewed in Fig. 4, it will be seen that the yoke 37 extends across the conveyor bed and is provided with two vertical sides which are designated as 39 and 39a, respectively, which sides are reinforced by webs 41 and 41a, the bottom of the yoke 37 being connected by an apron 43. This apron 43 is provided with a flange 45, which forms a stop for the yoke 47 of piston assembly 49, which will be described in detail hereinafter.

The side 39 of the yoke assembly 37 has an inwardly extending bracket 51 on which is mounted a plate 53, this having an arcuate slot 55.

The side 39a of the yoke 37 has a plate 53' mounted thereon, which plate has an arcuate slot therein, this slot 55' corresponding in every way with the slot 55 except that its curvature is opposite to that of the slot 55, the two slots therefore presenting an upwardly diverging path of travel for the lifting devices.

The piston assembly 49 comprises a piston yoke 47 operating responsively to fluid pressure in a piston cylinder 57 containing piston head 57a. The piston yoke 47 is secured to a rod 59 which extends through a stuffing box 61, and carries the yoke 47, which is held in place by a nut 64. The yoke 47 has oppositely extending wings 63, 63', having upwardly converging diagonal slots 65, 65' therein.

Lifting devices 67, 67' are mounted in these slots 65, 65', being thereby connected to the piston head and also in the arcuate slots 55, 55', the mounting means being shown in Fig. 5, which view illustrates the construction of the lifting devices.

It will be seen from Fig. 6 that these lifting devices include a bracket 69, the ends of which are upturned and notched as is indicated at 71, these notches forming rests for the wire bars. It will be seen that the lifting arms 73 may be composed of a plurality of sections, secured together at the bottom by a bolt 75 which operates in slots 65 or 65', and intermediate the bottom by a shaft 77 upon which is mounted a roller 79 inside the lifting arm and forms a roller bearing for the arm as it moves responsively to the motion of the shaft 77 and bolt 75 in the slots 55, 55' as the piston yoke 47 moves up and down, as will be described hereinafter.

It will be seen, therefore, that when the corresponding pairs of lifting devices receive a pair of wire bars, an upward actuation of the piston causes the corresponding lifting brackets to move away from each other, thereby turning the wire bars 31, 31 in the manner indicated in Fig. 4 by dotted lines. The up and down movement of the piston is very rapid, responsive to its actuation, the result being to "kick" over the wire bars so as to bring up, successively, each side of the bars for final inspection and chipping, if such be needed.

In Fig. 4, there is illustrated also the actuation of the piston operating mechanism, the piston head 57a in the right-hand view being in position to start to lift, while the left-hand piston head 57a is in returned position. The pistons are operated conveniently by compressed air, which enters a rotary valve 81, 81', through intake pipe 83, 83', each of which is connected to a source of compressed air, not shown.

In operating the lifting devices 67 to effect turning over of the bars 31 so that they can be examined, the lifting arms 73 are moved vertically engaging the outer edge portions of the bars in the notches 71. The arms are forced upwardly by a rapid movement and the edge portions of the bars 31 are carried along rotating the bars about their longitudinal axis, as shown in dotted lines on Figure 4. During this movement the arms 73 move upwardly and outwardly due to the action of the rollers 79 mounted on the arms and which travel in the arcuate slot 55. In this manner the bars 31 are rotated approximately 90°, the rotation being checked by contact of the adjacent flat surface of the bar with the conveyor rollers 9.

During the retraction of the lifting arms 73, it will be observed that the notched members 71 are to be returned to their original position below the conveyor rollers 9, in order to be in position to again engage the outer edges of the bars 31 and flip them over to present a new side for inspection. In order to clear the bars 31, upon retraction of the arms 73 the yoke 47 is provided with upwardly converging diagonal slots 65 and 65' through which bolt means 75 on arms 73 passes forming an interconnecting member between yoke 47 and arms 73. The slots 65 and 65' function as cams and force the bolt 75 into the upper portion of the slots during downward movement of the arms 73. In this instance the arms 73 act as levers pivoting about the roller 79 tilting outwardly to increase the space between their respective notches 71 allowing the arms 73 to be retracted to a position below the bars 31 without interfering therewith.

While these valves may be of widely different construction as to details, the illustrated construction shows a valve having four ports 85, 87, 89, 91, and 85', 87', 89' and 91', all of which ports of each valve open into a common chamber 93 or 93', in which is mounted a rotary valve member 95 or 95', which is operated by a treadle 97 or 97', pressure upon which rotates the valve member, 95, 95', the treadle arm 96, 96' being connected at a point intermediate its ends to the valve member, one end of the treadle arm being held down normally by the tension of a spring 99, 99', so as to hold the treadle in the position shown at the left-hand side of Fig. 4, as will be described in more detail hereinafter.

In Fig. 4 it will be seen that the intake lines 83 and 83' connect respectively with the valve ports 85, 85'. But it will be seen that, on the left-hand side of Fig. 4, the line 101 connects the port 87 to the top of the valve cylinder 57 so as to admit air pressure above the piston head 57a to return positively the latter for the next cycle of operation, whereas port 87' is connected to line 101', which enters the cylinder 57' below the piston head 57a to lift the piston from its down position. Both of ports 89 and 89' are vented to the air.

Port 91 is connected to the bottom of cylinder 57 by line 103, below the piston 57a, while port 91' is connected to the top of the cylinder 57' by the line 103'.

Now, when pressure is applied to treadle 97' so as to depress the treadle against the force of the tension of spring 99', the valve-member 95' is shifted into the position shown in the right-hand view of Fig. 4, air pressure enters the valve through line 83' and passes from the valve into cylinder 57' through line 101', thus lifting the piston head 55' into the dotted line position, this in turn lifting the lifting devices, which impart a quarter-turn to the wire bars 31, 31, but when the treadle 97' is released the spring automatically returns the valve to its former position, which is that shown on the left-hand side of Fig. 4, where air pressure is shown as entering the valve 81 through line 83, thence passing through line 101 into the top of the cylinder 57 to drop the piston head 57a, which moves the lifters 67 into downward position, holding the wire bars in the quarter-turn until that upper surface is inspected. Each successive operation therefore presents a fresh surface of the bar for inspection until all requisite surfaces have been examined.

As the piston head 57a drops, the air beneath it is forced out of the cylinder 57 through line 103, port 91, valve 81 and vent 105. Both pistons act in the same way, for when treadle 97' is released, spring 99' returns it to starting position, the air then passing from intake line 83', valve 81', line 103' into the top of the cylinder 57' to cause the piston head 55' to drop rapidly, the air beneath the piston passing out of the cylinder 57' through line 101', valve 81' and vent 105'.

In order to effect the inspection, the inspected section of the conveyor is provided with a retractable stop 112, operation of which is produced through a series of links operated from a handle 107, this stop holding the bars on the inspection section of the conveyor until all sides of the bars have been inspected. In practice it is desirable to duplicate this stop 112', at the advance end of the inspection section of the conveyor, these stops 112, 112' defining arms of rotating spiders mounted on shafts 111, 111' which extend entirely across the conveyor frame and carry similar stops and spiders on the other section of the conveyor. Arm 108 of the rear spider carries an operating handle 107, a third arm 110 of the rear spider being connected to a corresponding arm 110' of the forward spider by links 109, 109'. Consequently when an operator lowers the handle 107, the stop 112 is raised and the arm 110 is moved to actuate the corresponding arm 110' through the links 109, 109', so as to raise the forward stop 112' as the rear stop 112 is raised, thereby preventing passage of additional bars into the inspection section until the bars that are in that section are inspected. Retraction of the stop 112 by lifting the handle 107 releases the bars from the inspection section and as the stop 112' is retracted simultaneously, bars that were held back by this stop will pass into the section when the stops are raised again.

As has been stated above, the stops and their operating system are duplicated on both sides of the conveyor.

Suitable supporting means, such as are indicated generally by 113 may be provided, such supporting means being channel beams welded together to form a supporting frame and to the cross-beams 115, 115' of the conveyor, from which cross-beams the supporting frame is suspended.

What is claimed is:

1. An inspection conveyor for cast metal shapes along which the shapes are adapted to pass from a loading station to an unloading station, an inspection section forming a part of the conveyor intermediate the loading station and the unloading station, along which section the shapes must pass in transit to the unloading station, mechanism comprising reciprocable lifting means engageable with a plurality of said shapes while supported on said conveyor, said lifting means being movable upwardly in engagement with said plurality of shapes to bring about the turning of the same through successive arcs of substantially ninety degrees for enabling successive sides of the shapes to be brought into position for ready inspection, and means for retaining the shapes on the said inspection section until all of the sides of the shapes have been inspected.

2. An inspection conveyor for copper wire bars along which the bars are adapted to pass from a loading station to an unloading station, an inspection section forming a part of the conveyor intermediate the loading station and the unloading station, along which section the wire bars must pass in transit to the unloading station, mechanism comprising reciprocable lifting means engageable with a plurality of said wire bars while supported on said conveyor, said lifting means being movable upwardly in engagement with said plurality of wire bars to bring about the turning of the same through successive arcs of substantially ninety degrees for enabling successive sides of the wire bars to be brought into position for ready inspection, means for retaining the wire bars on the said inspection section of the conveyor and for preventing additional bars entering the section, and mechanism for withdrawing the said means to replace the bars.

3. An inspection conveyor for copper wire bars along which the bars are adapted to pass in pairs side by side from a loading station to an unloading station, the conveyor including an inspection section intermediate the loading station and the unloading station, along which section the wire bars must pass in transit to the unloading station, and mechanism comprising interconnected spaced lifting arms which are arranged to move upwardly and outwardly, said spaced arms being adapted to engage the outer edges of said bars and raise the same for oppositely turning each pair of wire bars through successive arcs of ninety degrees for enabling the bars to be turned simultaneously to present successive sides of the bars for ready inspection.

4. An inspection conveyor for copper wire bars along which the bars are adapted to pass in pairs side by side from a loading station to an unloading station, the conveyor including an inspection section intermediate the loading station and the unloading station, along which section the wire bars must pass in transit to the unloading station, and mechanism comprising a plurality of coacting lifter arm means which are arranged to engage the outermost edge portion of the bars for oppositely turning each pair of wire bars through successive arcs of ninety degrees for enabling the bars to be turned simultaneously for presenting successive sides of the bars for ready inspection, means for retaining wire bars side by side on the said inspection section until inspection is complete, and means for restraining additional wire bars from entering the inspection section of the conveyor while wire bars are being inspected, and instrumentalities for operating the said means for releasing the said instrumentalities.

5. An inspection conveyor for copper wire bars along which the bars are adapted to pass in pairs side by side from a loading station to an unloading station, the conveyor including an inspection section intermediate the loading station and the unloading station along which section the wire bars must pass in transit to the unloading station, the said section including lifting means acting upon each pair of bars to turn the bars to bring successively each side thereof into inspection position, said lifting means comprising vertically and laterally movable arm members arranged to move in engagement with the outermost edges of said pair of bars and turn the same while the bars are in contact with each other, and mechanism for operating the lifting means.

6. An inspection conveyor for copper wire bars along which the bars are adapted to pass in pairs side by side from a loading station to an unloading station, the conveyor including an inspection section intermediate the loading station and the unloading station, along which section the wire bars must pass in transit to the unloading station, the said section including lifting means adapted to act upon each pair of bars to turn the bars to bring successively each side thereof into inspection position, the said lifting means comprising arms for receiving the wire bars, means for lifting the arms, guides for causing the arms to move apart on their upward movement to cause the bars to turn and to cause the arms to move together on their downward movement to retain the bars in turned position and ready for further turning responsively to the next lifting of the arms, and mechanism for operating the arms.

7. An inspection conveyor for copper wire bars along which the bars are adapted to pass in pairs side by side from a loading station to an unloading station, said conveyor comprising a frame having conveyor means mounted thereon, an inspection section forming a part of the conveyer along which the bars must pass in transit to the unloading station, said section including lifting means adapted to act upon each pair of bars to bring successively each side thereof into inspection position, the said lifting means comprising arms for receiving the wire bars, means for lifting the arms, bar-receiving devices on the arms for holding the bars thereon, the said devices including means for facilitating turning of the bars responsive to movement of the said arms, supporting means for the lifting arms, guides in the supporting means for causing the arms to spread apart on their upward movement to cause the bars to turn, instrumentalities operatively connecting the said arms to the guides, the said guides causing the arms to close on their downward movement to retain the bars in turned position and ready for further turning responsively to the next lifting of the arms, supporting means for the guides spanning the conveyor frame, and mechanism for operating the arms.

8. An inspection conveyor for copper wire bars along which the bars are adapted to pass in pairs side by side from a loading station to an unloading station, said conveyor comprising a frame having conveyor means mounted thereon, an inspection section forming a part of the conveyer along which the bars must pass in transit to the unloading station, said section including lifting means adapted to act upon each pair of bars to bring successively each side thereof into inspection position, the said lifting means comprising arms for receiving the wire bars, means for lifting the arms, bar-receiving devices on the arms for holding the bars thereon, the said devices including means for facilitating turning of the bars responsive to movement of the said arms, supporting means for facilitating turning of the bars responsive to movement of the said arms, supporting means for the lifting arms, guides for said last mentioned supporting means for causing the arms to spread apart on their upward movement to cause the bars to turn, instrumentalities operatively connecting the said arms to the guides, the said guides causing the arms to close on their downward movement to retain the bars in turned position and ready for further turning responsively to the next lifting of the arms, supporting means for the guides spanning the conveyor frame, actuating means for the lifting arms interconnected therewith, and mechanism for operating the actuating means.

9. An inspection conveyor for copper wire bars along which the bars are adapted to pass in pairs side by side from a loading station to an unloading station, said conveyor comprising a frame having conveyor means mounted thereon, an inspection section forming a part of the conveyor along which the bars must pass in transit to the unloading station, said section including lifting means adapted to act upon each pair of bars to bring successively each side thereof into inspection position, the said lifting means comprising arms for receiving the wire bars, means for lifting the arms, bar-receiving devices on the arms for holding the bars thereon, the said devices including means for facilitating turning of the bars responsive to movement of the said arms, supporting means for facilitating turning of the bars responsive to movement of the said arms, supporting means for the lifting arms, guides for said last mentioned supporting means for causing the arms to spread apart on their upward movement to cause the bars to turn, instrumentalities operatively connecting the said arms to the guides, the said guides causing the arms to move inwardly on their downward movement to retain the bars in turned position and ready for further turning responsively to the next lifting of the arms, supporting means for the guides defining a yoke spanning the conveyor frame, fluid-pressure piston for actuating the arms, a cylinder for the piston, means for introducing fluid under pressure into the cylinder to lift the piston, means for introducing fluid behind the piston to return the piston, means for venting fluid from the cylinder upon return of the piston, and means connecting the arms to the piston for operation responsive to movement of the piston.

10. Apparatus as set forth in claim 9 wherein the piston includes a yoke having oppositely extending wings, and means movably connecting the arms to the said wings so that the arms may move in the wings responsively to movement of the piston.

JOHN G. LECKIE.
EUGENE W. STEELE.